United States Patent Office 2,802,775
Patented Aug. 13, 1957

2,802,775

11 ALPHA-HYDROXYLATION OF STEROIDS BY ASPERGILLUS OCHRACEUS

Eugene L. Dulaney, Rahway, and William McAleer, Elizabeth, N. J., assignors to Merck & Co., Inc., Rahway, N. J., a corporation of New Jersey No Drawing. Application May 29, 1953, Serial No. 358,528

10 Claims. (Cl. 195—51)

This invention relates to an improved method of introducing oxygen substituents into a steroid molecule. More particularly, it is concerned with a process of preparing 11-hydroxy steroids by subjecting 11-desoxy steroids to the action of an oxygenating strain of *Aspergillus ochraceus* or the oxygenating enzymes of this microorganism.

The discovery of the remarkable therapeutic properties of cortisone and similar related compounds having an oxygen substituent at C–11 has stimulated wide interest in finding simpler and more economical methods of preparing such compounds. One of the principal difficulties encountered in the synthesis of cortisone and its related compounds is the introduction of the 11-oxygen substituent. Although various methods have been developed for the synthesis of 11-oxygenated steroids, such processes are not entirely satisfactory and other methods more suitable for the commercial preparation of 11-oxygen substituted steroids in high yields have been sought.

Methods for effecting the oxygenation of steroids by the action of microorganisms are known in the art. For example, *Proactinomyces erythropolis* has been shown to be capable of introducing oxygen at position 17 of steroids. Various species of actinomycetes are also known to introduce oxygen into a number of positions of the steroid molecule, including position 11. Similarly, various species of genera included in the order Mucorales also introduce oxygen in various positions of the steroid ring structure.

Unfortunately, the utilization of the known procedures for introducing oxygen substituents at position 11 by the action of microorganisms is beset by a number of troublesome difficulties. One such difficulty is that the oxygenation results in the formation of a multiplicity of oxygenated products which are difficult to separate, thereby resulting in the obtainment of poor yields of the desired 11-oxygenated steroids. A further difficulty is that many oxygenating microorganisms, such as various species of the Mucorales, are very specific in their nutritional requirements. For example, they are unable to utilize nitrogen in the form of nitrate. Consequently, the culture mediums suitable for growing such microorganisms are limited. Also, the spores of many of the Phycomycetes, including the Mucorales, are destroyed by the lyophilization procedure; therefore great difficulty is encountered in retaining their desirable properties since the cultures are subject to degeneration. Further, the Mucorales grow very poorly under submerged conditions and, if any foam is allowed to collect on the surface of the fermentation liquor, the Mucorales collect in the foam and develop as a pellicle over the surface of the culture liquor. This formation of a surface pellicle is undesirable since such growth does not permit the microorganism to come in intimate contact with the steroid contained in the main body of the fermentation broth. Under these conditions, therefore, large amounts of antifoam agents are required which complicates the isolation of the desired oxygenated steroids.

It is an object of the present invention to provide a process for the production of 11-oxygenated steroids which will avoid the difficulties encountered in the processes previously available. Other objects will be apparent from the detailed description of our invention hereinafter provided.

In accordance with our present invention, it is now found that the oxygenation of steroids is conveniently effected by subjecting steroids to the action of an oxygenating strain of *Aspergillus ochraceus* or oxygenating enzymes produced by this microorganism. The practice of our invention is particularly suitable for converting 11-desoxy steroids to the corresponding 11-hydroxy steroids in high yields. Thus, our method provides a valuable means for introducing an 11-oxygen substituent and thereby preparing products suitable as intermediates for the production of cortisone and compounds related thereto.

The processes of our invention are particularly valuable since the use of *Aspergillus ochraceus* obviates many difficulties attendant with the use of other microorganisms. One of the principal advantages of our process is that the action of *Aspergillus ochraceus* will introduce oxygen selectively in positions 11 and 6. This is very important since it results in the obtainment of better yields of the desired products and a much simpler process for effecting their recovery. Another important characteristic of the *Aspergillus ochraceus* process is the ability of the organism to grow on and oxidize sterols in a great variety of culture media. Thus, in contrast to other oxygenating organisms, this organism is ubiquitous in its ability to utilize many nitrogenous compounds, including inorganic forms such as nitrates. Further, *Aspergillus ochraceus* is very stable and can be lyophilized and stored without affecting its oxygenating characteristics. In addition, the fermentation with *Aspergillus ochraceus* can be carried out in mediums containing only minor amounts of antifoam agents thereby facilitating the recovery of the desired oxygenated products.

The microorganism, *Aspergillus ochraceus*, employed in the process of this invention is identified and characterized on page 279 of the text, "A Manual of Aspergilli" by Thom and Raper. Strains of *Aspergillus ochraceus* capable of effecting the oxygenation of steroids can be obtained from known culture collections. For example, one such culture, *Aspergillus ochraceus* Peoria No. 405–260–4718, can be obtained from the Northern Regional Research Laboratory at Peoria, Illinois.

In carrying out the process of our invention, the steroid to be oxygenated is subjected to the action of an oxygenated enzyme produced by growing an oxygenating strain of *Aspergillus ochraceus*. This is most conveniently accomplished by growing the microorganism under aerobic conditions in a suitable nutrient medium in intimate contact with the steroid to be oxygenated; the fermentation or growing of the microorganism being continued until the desired oxygenation has occurred. Thus, the steroid to be oxygenated can be incorporated directly in a suitable medium which is then inoculated with an oxygenating strain of *Aspergillus ochraceus* and incubated under aerobic conditions thereby effecting the desired oxygenation. Generally, our process is preferably effected by first growing the microorganism in a suitable fermentation medium, then adding the steroid and continuing the cultivation of the microorganism under aerobic conditions for sufficient time to effect the desired oxygenation.

The steroid can be added to the nutrient medium as a suspension in a suitable solvent such as water, as a solution in a solvent such as acetone or propylene glycol, or in a finely divided form such as a solid micronized powder. In general, it is desirable that the steroid be present in very finely divided form in order to permit maximum contact with the oxygenated culture medium and insure completion of the reaction.

The process of the present invention can be effected in both stationary and submerged cultures of *Aspergillus ochraceus* growing under aerobic conditions, although for practical purposes it is most conveniently carried out by growing the microorganism under submerged conditions in a suitable aqueous fermentation medium containing the steroid. The amount of the steroid which can be conveniently oxygenated by our method will depend in part upon the particular medium employed.

Aqueous nutrient mediums suitable for the growing of oxygenating strains of *Aspergillus ochraceus* must contain sources of assimilable carbon and nitrogen as well as minor amounts of inorganic salts. Any of the usual sources of assimilable carbon such as dextrose, cerelose, glucose, inverted molasses, and the like, employed in fermentation mediums can be used in carrying out the process of our invention. Similarly, complex sources of nitrogen usually employed in commercial fermentation process such as lactalbumin digest ("Edamine") and corn steep liquor, or inorganic sources of nitrogen such as sodium nitrate, ammonium nitrate, and the like, are satisfactory for use in the fermentation mediums. Minor amounts of inorganic salts such as suitable soluble salts of magnesium, potassium, sodium and iron are usually available in complex sources of carbon and nitrogen or may be conveniently added to the fermentation medium in minor amounts to promote maximum growth of the oxygenating microorganism.

The following are examples of suitable aqueous nutrient mediums which can be used in our process of oxygenating steroids:

MEDIUM NO. 1

| | Grams |
|---|---|
| Commercial dextrose (cerelose) | 50.00 |
| Commercial lactalbumin digest (Edamine) | 20.00 |
| Corn steep liquor | 5.0 |

Distilled water is added to give a total volume of 1 liter of nutrient medium and the pH adjusted to 6.5 with sodium hydroxide.

MEDIUM NO. 2

| | Grams |
|---|---|
| Glucose (sterilized separately) | 50.00 |
| NaNO$_3$ | 3.00 |
| K$_2$HPO$_4$ | 1.0 |
| MgSO$_4$ | 0.5 |
| KCl | 0.5 |
| FeSO$_4$.7H$_2$O | 0.01 |

Distilled water is added to make 1 liter and the pH adjusted to 6.5 with aqueous sodium hydroxide solution.

MEDIUM NO. 3

| | Grams |
|---|---|
| Inverted black strap molasses | 100.0 |
| Commercial lactalbumin digest (Edamine) | 20.0 |
| Corn steep liquor | 5.0 |

Distilled water is added to give a total volume of 1 liter of nutrient medium and the pH adjusted to 6.5 with sodium hydroxide.

MEDIUM NO. 4

| | Grams |
|---|---|
| Inverted black strap molasses | 100.0 |
| Corn steep liquor | 5.0 |

Distilled water is added to give a total volume of 1 liter of nutrient medium and the pH adjusted to 6.5 with sodium hydroxide.

MEDIUM NO. 5

| | Grams |
|---|---|
| Inverted black strap molasses | 100.0 |
| Corn steep liquor | 20.0 |

Distilled water is added to give a total volume of 1 liter of nutrient medium and the pH adjusted to 6.5 with sodium hydroxide.

MEDIUM No. 6

| | Grams |
|---|---|
| Inverted black strap molasses | 50.0 |
| Corn steep liquor | 6.3 |

Distilled water is added to give a total volume of 1 liter of nutrient medium and the pH adjusted to 6.5 with sodium hydroxide.

MEDIUM NO. 7

| | Grams |
|---|---|
| Sucrose | 50.0 |
| NaNO$_3$ | 7.6 |
| K$_2$HPO$_4$ | 1.0 |
| MgSO$_4$ | 0.5 |
| KCl | 0.5 |
| FeSO$_4$.7H$_2$O | 0.01 |

Distilled water is added to give a total volume of 1 liter of nutrient medium and the pH adjusted to 6.5 with sodium hydroxide.

The addition of minor amounts of anti-foaming agents, although not essential, is desirable with some fermentation mediums in order to obtain maximum yields of the desired oxygenated product. We have found that the addition to certain fermentation mediums of a substituted oxazaline which is a non-volatile, amine-type, cationic surface active agent available under the trade name Alkaterge C is particularly effective in reducing the amount of foam, although other anti-foam agents known to be useful for this purpose can also be used.

As indicated above, the process of our invention is particularly useful in the oxygenation of 11-desoxy steroids to obtain the corresponding 11-hydroxy steroids which are suitable intermediates in the preparation of cortisone and related compounds. Thus, our process is applicable in general to saturated and unsaturated cyclopentanopolyhydrophenanthrene compounds having an unoxygenated eleven position. Such cyclopentanopolyhydrophenanthrene compounds may be unsubstituted or may contain substituents such as keto, hydroxyl, acyloxy, halide, alkyl, and the like at various positions of the cyclopentanopolyhydrophenanthrene nucleus. In addition, such compounds may have at the 17 position, a ketol side chain, a saturated or unsaturated hydrocarbon side chain, a carboxyl containing side chain, and the like. Examples of classes of such cyclopentanopolyhydrophenanthrene compounds that might be mentioned are pregnanes, pregnenes, allopregnanes, allopregnenes, androstanes, bile acids, sterols, hormones, sapogenins, and derivatives thereof. Thus, representatives steroids having an eleven methylene group such as progesterone, Δ$^4$-pregnene-17α-ol-3,20 - dione, desoxycorticosterone, Δ$^4$-pregnene-17α-21-diol-3,20-dione, 3-keto-cholanic acid, lithocholic acid, diosgenin, dichloro diosgenin, Δ$^5$-pregnene - 3β - ol - 20 - one, 5,6 - dichloro-pregnane-3β-ol-20-one, 5,6-dichloropregnane-21-ol-3,20 - dione, 5,6-dichloropregnane-17α,21-diol-3,20-dione, and the like, can be oxygenated at position 11 to obtain the corresponding 11-hydroxy derivatives.

For example, progesterone can be oxygenated in accordance with the following procedure:

A sterile culture medium, such as those shown above, is first inoculated by introducing a small amount of spore suspension or vegetative growth of an oxygenating strain of *Aspergillus ochraceus*. The inoculated nutrient medium is then incubated at a temperature of about 27–28° C., while being agitated in the presence of oxygen for a period of about 24–48 hours. At this point, a solution of progesterone in propylene glycol is added to the fermentation medium and the agitation and aeration of the nutrient medium continued for about 5 to 30 hours, or until the oxygenation reaction is completed.

When the oxygenation is complete, the oxygenated steroid may be recovered from the fermentation broth by extraction with a suitable water immiscible organic solvent for the oxygenated steroids. Suitable solvents for this purpose that might be mentioned are chloroform, methylene chloride, organic acid esters, aromatic hydrocarbons, and the like. The solvent solution containing the desired oxygenated steroid can then be evaporated to yield the desired product which may be further purified by recrystallization or other procedures conventional in the art.

Alternatively, the process of our invention can be effected by contacting the oxygenating enzymes produced by the fermentation of *Aspergillus ochraceus* with the steroid to be oxygenated. This can be accomplished by recovering the oxygenating enzymes from a fermentation broth in accordance with procedures known in the art, and intimately contacting such enzymes with a steroid in an aqueous medium.

In the oxygenation of some 11-desoxy steroids, there is produced, in addition to the desired 11-hydroxy steroid, a minor amount of the corresponding 6,11-dihydroxy steroid. This dihydroxy compound can be readily converted to the 11-hydroxy compound by heating with zinc and acetic acid.

The following examples illustrate methods of carrying out the process of the present invention.

Example 1

Approximately 3.2 liters of nutrient medium No. 1 shown above and the minimum quantity of a substituted oxazaline (Alkaterge C) required to prevent foaming was sterilized for ½ hour at 100° C. After sterilization the medium was inoculated with approximately 250 ml. of a vegetative growth of an oxidizing strain of *Aspergillus ochraceus* culture 405–260–4718 in the collection of the Northern Regional Research Laboratory at Peoria, Illinois. The mixture was then agitated using a 2 turbine type agitator at 560 R. P. M. and air was passed in at a rate of 3 liters per minute maintaining the temperature at 28° C. for a period of approximately 24 hours.

At the end of the 24 hour period 1.28 g. of progesterone dissolved in 160 ml. propylene glycol was added to the fermented medium and agitation of the medium continued at the same rate. Aeration of the medium was continued at 3.0 l./minute for six hours and then interrupted for six hours. This procedure was continued for a period of thirty-six hours following addition of the steroid.

Following the oxidation cycle, the steroid containing fermented medium was sterilized and a portion was assayed in the following manner:

A 50 ml. portion of fermented medium was filtered to remove the mycelial growth and the filtrate was extracted with chloroform. The mycelium was washed with acetone to remove any steroid material and the acetone wash liquor combined with the chloroform extract. The combined solvent solution was then evaporated to dryness and the residual material dissolved in 1 ml. of chloroform. Approximately, 20 microliters of the chloroform solution was developed on a papergram according to the method of Zaffaroni reported in Science III, 6 (1950). The positions of the steroid spots on the paper were located by means of an ultra-violet scanner and these spots cut out and eluted from the paper with methanol. The optical density of the methanol solution was then measured in a Beckman spectrophotometer and by comparison with standard curves for the pure compounds the following results were obtained:

Percent of starting progesterone
11α-hydroxyprogesterone _____ 69.0
6,11-α-dihydroxyprogesterone _____ 12.5

Crystalline 11-α-hydroxyprogesterone was isolated from another portion of the fermented medium by extraction with chloroform, removal of the chloroform in vacuo and recrystallization of the residual material from ethyl acetate.

Example 2

Approximately 3.2 liters of nutrient medium No. 1 plus the minimum quantity of Alkaterge C required to prevent foaming was treated in the same manner as in experiment 1 except that agitation was carried out at 408 R. P. M. for a period of 29 hours.

At this point 1.28 g. of progesterone, dissolved in 160 ml. of propylene glycol, was added to the fermented medium. Agitation was continued at the same rate and aeration continued at 3.0 liters/minute for 24 hours.

Approximately 840 ml. of the resulting fermented medium was extracted with three 500 ml. portions of chloroform. The chloroform extracts were combined and washed successively with 3% sodium bicarbonate solution and water and dried over sodium sulfate. The chloroform extract (20 microliters) was assayed in the same manner as described in Example 1 with the following results:

Percent of starting progesterone
11-α-hydroxyprogesterone _____ 62.5
6,11-α-dihydroxyprogesterone _____ 8.95

The above chloroform extracts were then concentrated in vacuo and the residual material dissolved in 20 ml. benzene, filtered, the benzene removed in vacuo and the residual material crystallized from ethyl acetate to give essentially pure 11-α-hydroxyprogesterone, M. P. 165–168° C.

Example 3

Approximately 50 ml. of medium No. 6 in a 250 ml. Erlenmeyer flask was sterilized and inoculated with 1 ml. of spore suspension of an oxygenating strain of *A. ochraceus* organisms. The flask containing the inoculated medium was then incubated at 27–28° C. on a rotary shaker for approximately 72 hours. At this point a solution of 10 mg. of progesterone in 2.5 ml. of propylene glycol was added and shaking continued. Samples were removed from the flask at intervals during the oxidation cycle and assayed by papergrams as described in Example 1. The following results were obtained:

| Time interval after Steroid addition | Percent of Starting Progesterone as— | |
|---|---|---|
| | 11α-hydroxy-progesterone | 6,11α-dihydroxy-progesterone |
| 6 hrs | 63 | 4 |
| 12 hrs | 73 | 15 |
| 18 hrs | 67 | 24 |

Example 4

The procedure of Example 3 was repeated using medium 7 with the following results:

| Time interval after Steroid addition | Percent of Starting Progesterone as— | |
|---|---|---|
| | 11α-hydroxy-progesterone | 6,11α-dihydroxy-progesterone |
| 12 hrs | 44.5 | |
| 18 hrs | 71.3 | 5.1 |
| 24 hrs | 81.4 | 7.4 |

Example 5

Approximately 3.2 liters of nutrient medium No. 1, plus the minimum quantity of Alkaterge C required to prevent foaming, was prepared and inoculated as in Example 1. Immediately, 1.28 grams of progesterone dissolved in 160 ml. of propylene glycol was added. The culture was agitated continuously at 560 R. P. M. and aerated at 3.0 l./min. for 48 hours. Samples were removed at 6-hour intervals and assayed by papergram as described in Example 1. Transformation products were present 6 hours after inoculation with *A. ochraceus* and simultaneous addition of progesterone. The maximum yield of oxidized sterol was reached following 18 hours' incubation. 8.0% of the starting progesterone was analyzed as 6,11α-dihydroxy progesterone and 26.2% of the starting progesterone was analyzed as 11α-hydroxy progesterone.

Example 6

Approximately 3.2 liters of nutrient medium No. 1, plus the minimum quantity of Alkaterge C required to prevent foaming, was treated in the same manner as in Experiment 1. At the end of 24 hours of fermentation, 1.28 grams of 17α hydroxy-11-desoxy corticosterone (substance S) was added and the mixture was agitated in the presence of air for a period of approximately 20 hrs. and the medium was filtered to remove the mycelial growth and the filtered medium was extracted with three portions (1×500 ml.; 2×300 ml.) of n-propyl acetate. The combined extracts were washed with water. A portion of the n-propyl acetate was distilled from the extract and the residual steroidal material was developed on a papergram according to the method of Zaffaroni reported in Science III, 6 (1950). Comparison with an authentic sample indicated the extract contained epi compound F ($\Delta^4$-pregnene-11α,17α,21-triol-3,20-dione).

The remainder of the n-propyl acetate extract was concentrated in vacuo and the concentrate, when cooled, yielded a white crystalline product which was shown to be compound "epi" F ($\Delta^4$-pregnene-11α,17α,21-triol-3,20-dione) by comparison of its melting point, rotation, and ultra violet spectrum in concentrated sulfuric acid with an authentic sample.

Example 7

The procedure of Example 3 with the exception that medium No. 1 was employed was repeated. After 72 hours' incubation, a solution of 5 mg. of desoxycorticosterone in 2.5 ml. of propylene glycol was added and shaking continued for 24 hours. At the completion of the fermentation, the whole culture was extracted two times with 50 ml. portions of chloroform. The chloroform solution was evaporated to dryness and the residual material dissolved in 1 ml. of chloroform. Approximately 20 microliters of the chloroform solution was developed on a papergram according to the method of Zaffaroni. The position of the steroid spots on the paper were located by means of an ultra violet scanner. The positions were confirmed by a color test based on the reduction of tetrazolium. A control strip was developed with epi compound B, the 11α-hydroxy oxidation product of desoxycorticosterone. The oxidation product produced by *A. ochraceus* from desoxycorticosterone chromatographed identically with the reference sample of epi compound B, ($\Delta^4$-pregnene-11α,21-diol-3,20-dione), indicating that 11α-hydroxylation of desoxycorticosterone had taken place.

Example 8

The procedure of Example 3 was repeated with the exception that medium No. 1 was employed and that 2 ml. of three-day old vegetative inoculum was employed to initiate the fermentation. After 48 hours' incubation, 10 mg. of 3-keto-cholanic acid dissolved in 2.5 ml. of propylene glycol was added and shaking continued. Replicate fermentations were analyzed after 6, 12, 24 and 48 hours' further incubation and analyzed by the papergram procedure described in Example 8. Benzene-formamid-methanol was employed as the developing solution. 3-keto-cholanic acid moved at the solvent front. The 48-hour fermentation sample contained an oxidation product of 3-keto-cholanic acid which moved on the papergram with an Rf. of 0.22. The mobility of the conversion product is characteristic of a product of increased polarity such as 11α-hydroxy-3-keto-cholanic acid. The location of oxidation spots was accomplished through the formation of the colored 2,4-dinitrophenylhydrazone.

Example 9

The procedure of Example 8 was repeated with the exception that medium No. 1 was employed and that $\Delta^4$-pregnene-17α-ol-3,20-dione in propylene glycol solution was added to the culture of *A. ochraceus*. The papergram contained three steroid spots of Rf. 0.60, Rf. 0.30 and Rf. 0.065. $\Delta^4$-pregnene-3,20-dione-17(α)-ol on papergram development had a Rf. value of 0.60. The spot at Rf. 0.30 is characteristic of a dihydroxy steroid such as $\Delta^4$-pregnene-3,20-dione-11(α),17(α)-diol.

Example 10

Approximately 50 ml. of medium No. 7 in a 250 ml. Erlenmeyer flask was sterilized and inoculated with 1 ml. of vegetative growth of an oxygenating strain of *A. ochraceus*. The flask containing the inoculated medium was incubated at 28° C. on a rotary shaker for approximately 96 hours. The culture medium was decanted from the flasks and the mycelium of *A. ochraceus* suspended in 50 ml. of steroid medium No. 7 containing 10 mg. of progesterone. Flasks were incubated for 4.5 hours in order to adapt the cells to progesterone. The culture liquor was again decanted and the mycelium washed with a sodium hydroxide-potassium acid phthalate buffer at pH 4. The mycelium was resuspended in 50 ml. of buffer and 10 mg. of progesterone added. The flasks were incubated further on a rotary shaker and replicates analyzed after 0, 0.5, 1, 2, 4, 8, 12, and 24 hours. The following results were obtained:

| Incubation time, hrs. | Percent progesterone remaining | Percent 11α-hydroxy progesterone | Percent 11α-6β dihydroxy progesterone |
|---|---|---|---|
| 0 | [1] 125.0 | | |
| 0.5 | 105.2 | | |
| 1 | 63.8 | | |
| 2 | 18.5 | 54.5 | 4.9 |
| 4 | 25.6 | 96.5 | 7.9 |
| 8 | 7.4 | 66.8 | 27.9 |
| 12 | none | 121.4 | 21.9 |
| 24 | none | 65.9 | 44.4 |

[1] The steroid recoveries in excess of 100% can be attributed to failure to wash away completely the progesterone added to adapt the cells. In addition, the variation in steroid recovery is due to the removal of individual flasks for each time sample. The amount of steroid remaining after adoption varied from flask to flask.

Example 11

Approximately 50 ml. of medium No. 1 in a 250 ml. flask was sterilized and inoculated with 1 ml. of a spore suspension of an oxygenating string of *A. ochraceus*.

The flask containing the inoculated medium was then incubated at 27–28° C. on a rotary shaker for approximately 72 hours. At this point, a solution of 4 mg. of lithocholic acid in 2 ml. of ethyl alcohol was added and shaking continued.

Samples were removed from the flasks at the completion of the oxidation cycle and assayed by papergrams. Following development with solvent, the oxidation product of lithocholic acid was located by acidic areas on the papergrams. A single oxidation spot was present on the strip in the area of dihydroxy sterols. The spot was identified by comparative Rf. position with 3,11(α)-dihydroxycholanic acid.

Various changes and modifications may be made in our invention, certain preferred embodiments of which

We claim:

1. A process for the production of 11α-hydroxy steroids, which comprises subjecting a steroid having an eleven methylene group to the action of an oxygenating enzyme produced by an oxygenating strain of *Aspergillus ochraceus* under aerobic condition.

2. A process which comprises growing an oxygenating strain of *Aspergillus ochraceus* in an aqueous nutrient medium containing sources of assimilable carbon and nitrogen under aerobic submerged conditions in intimate contact with a steroid having an eleven methylene group to produce an 11α-hydroxy steroid.

3. The process of claim 2 wherein the 11-desoxy steroid is progesterone.

4. The process of claim 2 wherein the 11-desoxy steroid is desoxycorticosterone.

5. The process of claim 2 wherein the 11-desoxy steroid is Δ⁴-pregnene-3,20-dione-17α,21-diol.

6. The process of claim 2 wherein the 11-desoxy steroid is Δ⁴-pregnene-3,20-dione-17α-ol.

7. The process of claim 2 wherein 11-desoxy steroid is 3-keto-cholanic acid.

8. The process of claim 2 wherein the 11-desoxy steroid is lithocholic acid.

9. A process which comprises growing an oxygenating strain of *Aspergillus ochraceus* under aerobic conditions in an aqueous medium comprising assimilable sources of carbon and nitrogen and a steroid having an eleven methylene group, and isolating an 11α-hydroxy steroid from the resulting fermentation broth.

10. A process which comprises growing an oxygenating strain of *Aspergillus ochraceus* under aerobic conditions in an aqueous nutrient medium comprising inverted blackstrap molasses and corn steep liquor in intimate contact with a steroid having an eleven methylene group to produce the corresponding 11α-hydroxy steroid.

References Cited in the file of this patent

UNITED STATES PATENTS

| 2,649,402 | Murray et al. | Aug. 18, 1953 |

FOREIGN PATENTS

| 3476/51 | Australia | Aug. 30, 1951 |
| 4460/51 | Australia | Oct. 18, 1951 |